United States Patent [19]

Harris et al.

[11] Patent Number: 4,888,052
[45] Date of Patent: Dec. 19, 1989

[54] PRODUCING VOLATILE METALS

[76] Inventors: Ralph Harris, 372 Dulwich Ave., St. Lambert, Quebec, Canada, J4P 2Z2; James Toguri, 3558 Golden Orchard Drive, Mississauga, Ontario, Canada; Albert Wraith, Albion House, Warkworth, Northumberland, England

[21] Appl. No.: 201,446

[22] Filed: Jun. 2, 1988

[30] Foreign Application Priority Data

Jun. 8, 1987 [CA] Canada .................................. 539058

[51] Int. Cl.[4] ............................................. C22B 26/12
[52] U.S. Cl. ...................................... 75/20 R; 75/27; 75/66; 75/67 R
[58] Field of Search .................. 75/20 R, 27, 66, 67 R

[56] References Cited

U.S. PATENT DOCUMENTS

| 2,810,635 | 10/1957 | Cooper | 75/66 |
| 4,695,447 | 9/1987 | Shultz | 423/659 |
| 4,701,213 | 10/1987 | Judkins et al. | 75/27 |

Primary Examiner—Melvyn J. Andrews
Attorney, Agent, or Firm—Kevin P. Murphy

[57] ABSTRACT

Value metal belonging to Group IA or IIA of the Periodic Table is recovered from its ore or concentrate by mixing the latter, in finely divided form, with an excess of molten lixiviant reaction metal. This forms a mixture of an alloy of the value metal and the reaction metal and a dispersate of partly depleted source material. Value metal is vacuum refined from the alloy and recovered. The method may be conveniently carried out, continuously, in a closed vessel by the use of an apparatus according to the invention, having an upwardly extending treating passage for containing the reaction metal and extending upwardly to a vacuum space. Lifting gas is injected into the mixture to provide emission of the mixture in the form of a volley of droplets from which the value metal is vacuumed off. The remaining reaction metal and partly depleted source material are deposited in a catchment bath. The material from the catchment bath is partly recycled through a recycling passage to the reaction passage and partly passed to a reservoir for the reaction metal from which depleted source material is removed. Barometric legs lead from a submerged position in the reservoir to the bottom of the reaction passage and the bottom of the catchment bath respectively and electromagnetic pumps control the flow through these legs.

44 Claims, 3 Drawing Sheets

PRODUCING VOLATILE METALS

FIELD OF INVENTION

This invention relates to a method and apparatus for the extraction and recovery of Group IA and IIA metals from their ores or concentrates.

Since a preferred application of this method and apparatus is in the recovery of lithium and since this metal is typical, the invention will be described in terms of lithium recovery.

DESCRIPTION OF PRIOR ART

Current natural source materials employed for lithium recovery include brines, pegmatite ores and clays. See P. Mahi, A. A. J. Smeets, D. J. Fray and J. A. Charles, 'Lithium—Metal of the Future', Jour. Metals, Nov. 1986, pp. 20–26. A number of complex hydrometallurgical processing methods are used to produce, from these ores, brines and clays, high purity lithium chloride which is electrolysed to lithium metal and chlorine. The procedure is complex, expensive and toxic. The requirement for high purity arises from the supreme position of lithium in the electromotive series, causing co-deposition of any impurity which may be in the lithium chloride.

Additionally, presently non-commercial, pyrometallurgical processing methods have been disclosed which produce lithium as a vapour which must be condensed for recovery of the metal as a solid.

The pyrometallurgical processing methods can be separated into two classes, namely, those which use non-metallic reductants, for example, carbon and hydrogen, and those which use metallic reductants, for example, aluminum and silicon, however, there has been no development of the former. Usually the latter methods would utilize purified lithium oxide produced via a hydrometallurgical process as a feed material which is expensive and difficult to handle. See for example, M. G. Hanson, 'Method for Producing the Alkali Metals', U.S. Pat. No. 2,028,390 Jan., 21, 1936.

The direct reduction of spodumene, or spodumene concentrate has also been reported, see R. A. Stauffer, 'Production of Alkali Metals and Their Oxides', U.S. Pat. No. 2,424,512 July 22, 1947. Stauffer discovered that calcining spodumene at 1000° C. in the presence of calcium oxide released lithium oxide from the lattice of the spodumene crystal and facilitated the reduction of the lithium oxide by aluminum at 900° C. Stauffer's reduction process employed roughly the stoichiometric amount of powdered aluminum mixed with powdered spodumene. Twenty pound batches of the mixture was bricketted and placed in a vacuum retort at a pressure less than 10 micrometers of mercury, heated to 1100° C. and allowed to react for 3 hours. Lithium recoveries were in the range from 90 to 95%. The mixture remained as an unfused mass. This retorting process suffers from the disadvantages of high labour requirements and low production rates due to the slow heating and cooling of the vacuum retort.

Thus, in the hydrometallurgical processes, toxic, corrosive gases are used with difficulty and great cost and very great care must be taken to obtain a product free from detrimental contamination by other metals, for example, iron and silicon. In presently proposed pyrometallurgical processes, the operation is labour intensive and has low productivity or requires expensive feed material. As a result, the current cost of extracting and recovering lithium is very high.

SUMMARY OF INVENTION

The applicants have now found a low cost method of extracting lithium or other Group IA or Group IIA metals from their ores or concentrates (called for convenience 'value metal source materials') which avoids the use of toxic, corrosive electrolytes and gases, achieves high productivity and utilizes a low cost raw material.

The method intimately contacts the value metal source material with an excess of a molten metallic reductant, capable of acting as a lixiviant to the value metal. The mixture of reductant and source material remains fluid due to the excess of molten reductant. The value metal dissolves in the molten metallic lixiviant and is extracted as a vapour, by vacuum distillation, from which it may be recovered by condensation to the metallic state. The depleted value metal residue is separated from the excess molten reductant which may be replenished and recycled into contact with fresh source material.

In a preferred embodiment of the invention, the value metal source material is brought together and intimately mixed with a molten lixiviant, in which the latter is in excess, to produce a molten alloy of the lixiviant and value metal, and an at least partly depleted value metal residue dispersed therein.

Intensive mixing is preferrably provided for in a continuous method by injecting gas into the bottom of a reaction passage in contactor, into which the lixiviant, value metal source material and gas are passed. The lifting gas provides effervescence in the molten mixture so that volleys of droplets are emitted as a spray from its surface into the vacuum space above it. The value metal dissolved in the molten metallic lixiviant is extracted as a vapour by vacuum distillation of the droplets and recovered by condensation of the extracted value metal vapour to the metallic state. The spray of droplets is provided for by the explosive discharge, into the vacuum, of the mixing gas from the top of the effervescent molten mass in the reaction passage. The depleted value metal residue is separated from the molten metallic lixiviant and disposed of.

In a preferred treatment apparatus in which a continuous method is carried out, metallic lixivivant is contained in a reservoir which also acts as a residue separator vessel and is drawn via a barometric leg into the reaction passage. Lithium source material is added to the reaction passage and thoroughly mixed with the metallic lixiviant by the action of the lifting gas which is injected into the lower part of the reaction passage. Lithium is extracted from the lithium source material by the metallic lixiviant. The effervescent mixture of gas, metallic lixiviant, containing extracted lithium, and depleted and unreacted lithium source material which is formed in the reaction passage, is discharged from the reaction passage, into a vacuum separator chamber, as a volley of dispersed drops to form a shower falling, under the action of gravity, onto the upper surface of a catchment and recirculation bath.

Lithium evaporates from the shower of drops, separates from the drops and forms a mixture of gases with the non-condensible lifting and mixing gas. It may be desirable, if the vapour pressure of the lithium dissolved in the molten reductant is not high enough, to inject a non-condensible scavenging gas so as to avoid satura-} tion of the lithium vapour in the vacuum space. The gaseous mixture flows under the action of its own induced pressure gradient to the condenser where the lithium is separated from the non-condensible gases which continue flowing out of the vacuum chamber through the vacuum conduit due to the pressure gradient created by the vacuum pump or pumps.

The lithium vapour condenses on the surface of the condenser and flows under the action of gravity into a collection trough which is drained via a closable opening into an evacuated lithium collection and packaging vessel. The opening is closed by a block of lithium which can be recovered as well.

Most of the mixture of depleted metallic lixiviant and depleted and unreacted lithium source in the catchment bath recirculates through a restricted opening back into the reaction passage and the remainder of the mixture is drawn via a second barometric leg into the residue separator vessel where the depleted lithium source material floats out of the metallic lixiviant and is removed continuously by overflowing the separator vessel or by intermittent skimming.

Electromagnetic pumps are used to control the flow of metallic lixiviant into the reaction passage and to control the flow from the catchment bath mixture through the second barometric leg into the resevoir.

The applicants have found that preferred results are possible by simultaneously and continuously providing, in separate sections of the one apparatus or process, for the different residence times required to (i) extract the lithium from the lithium source, (ii) distill the lithium from the molten metallic lixiviant, (iii) condense the lithium to the metallic state and (iv) disengage the depleted lithium source material residue from the molten metallic lixiviant. The residence time for each step is determined by the different phenomena occurring in each step.

The residence time required to extract lithium from the lithium source material is fixed by the rate of reaction between liquid metal lixiviant and lithium source material and by the desired rate of production of lithium. The extraction rate may then be substantially at a maximum due to intense mixing in the reaction section of the process. The applicants have found that the residence time for extraction can be controlled by adjusting the difference between the rates at which the molten metallic lixiviant and unreacted lithium source material are fed to the contactor section of the process and the rate at which the mixture of molten metallic lixiviant and depleted lithium source residue is removed from the catchment section of the process.

It has also been found that the residence time required to distill lithium from the liquid metallic lixiviant is determined by the rates of mass transport in the system and by the surface area for evaporation. The distillation rate can be controlled by controlling the surface area for evaporation, see for example, R. Harris and A. E. Wraith, 'Purification of Liquid Metals', Canadian Patent No. 1,251,328, issued Mar. 21, 1989, at a level commensurate with the rate of extraction above. The rate of mass transport can be controlled, up to a thermodynamic maximum, by controlling the total pressure in the system and the rate of scavenger gas injection into the vacuum space through which the droplets are falling.

The residence time for condensation of lithium is determined by the rates of mass transport and the surface area of the condenser, see for example, R. B. Bird, W. E. Stewart and E. N. Lightfoot, *Transport Phenomena*, Wiley Int'l, New York, NY, 1960, pp. 586. The rate of condensation can be controlled by controlling the surface area for condensation at a level commensurate with the rate of extraction above.

The required residence time for disengagement of the depleted lithium source residue from the molten metallic lixiviant is determined by the rate of 'float-out' of the depleted lithium source particles. This rate is in turn affected by the size and shape of the particles which may be altered by additions to the system. The applicants have found that the residence time for disengagement can be controlled by adjusting the rate at which the mixture of liquid metallic lixiviant and depleted lithium source residue flows through the separator section of the process.

BRIEF DESCRIPTION OF THE DRAWINGS

The invention will now be described in more detail by reference to the accompanying drawings, which illustrate preferred embodiments, and in which.

DESCRIPTION OF PREFERRED EMBODIMENTS

Figure 1:
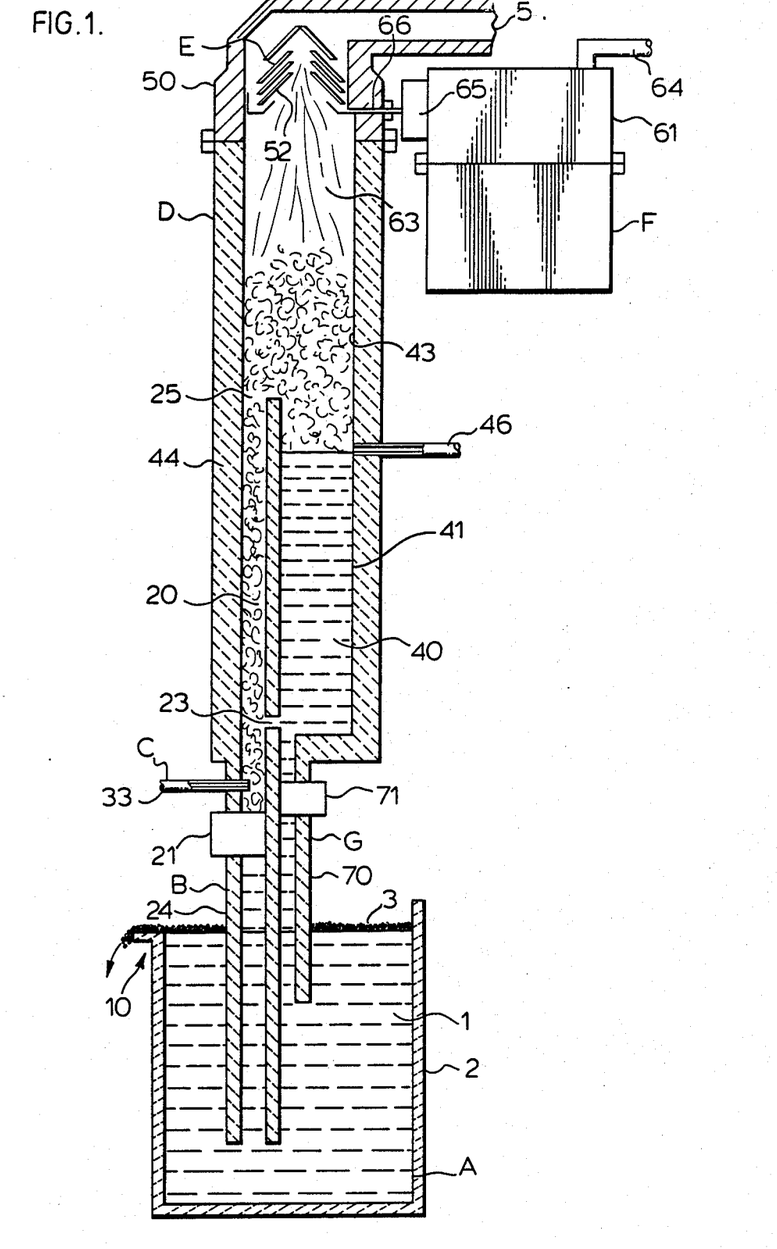
FIG. 1 is a vertical cross-section through a treatment apparatus suitable for carrying out a method according to the invention.

With further reference to FIG. 1, in which the different units of the apparatus are designated as follows: A designates a reservoir for the reaction metal which acts as a residue separator vessel, as a whole. B designates a molten reductant and lithium source material contactor, as a whole. C designates a gas injector, as a whole. D designates a vacuum separator, as a whole. E designates a lithium condenser, as a whole. F designates a lithium collector, as a whole. G designates a residue outlet, as a whole. While these units have been given separate reference letters, the apparatus is to all intents and purposes integral and the units independent, as shown.

The residue separator A includes an open-topped reservoir 2 to contain the molten lixiviant 1 for sufficiently long periods of time to allow for phase disengagement between the molten lixiviant 1 and the depleted lithium source material 3, and heating means, not shown, to provide the heat of reaction between the molten metallic lixiviant 1 and the lithium source and the sensible heat required to raise the temperature of the reactants to the operating temperature. Unit A also includes an overflow 10 which allows a continuous stream of depleted lithium source 1 to be removed from the system.

The contactor B extends from beneath the surface of the molten lixiviant 1 to a point above the catchment bath 41 which forms part of the Unit B. Unit B includes an electromagnetic pump 21 which controls the flow of molten lixiviant into the reaction passage 20 from the vessel 2 through barometric leg 24. A three phase mixture 22 is formed between a lifting gas which is injected through the injector 33, the powdered lithium source, not shown, which is added to the molten lixiviant in reaction passage 20 via pneumatic transport through the injector 33. Unit B also includes an opening 23 which allows the two phase mixture 40 residing in a catchment bath 41 to recirculate through the contactor 20.

Gas injector C leads from a controllable supply of gas, not shown, to a point within the reaction passage 20. Powdered ore or concentrate may be fed from a controllable supply, not shown, into the injector 33 and thereby introduced into the reaction passage 20.

Vacuum separator D includes a separator chamber 43 and a heating means, not shown, to ensure that no condensation of lithium vapours occurs on the walls of the separator 43. The Unit D is removably connected to the condenser unit E. The Unit D also includes a catchment bath 41 which receives from the reaction passage and holds the recirculating mixture 40 of molten lixiviant and depleted and unreacted lithium source.

Condenser E includes a vacuum tight housing 50, a conduit 54 leading to vacuum pumps, not shown, and a condenser 51 comprising a multiplicity of plates at an angle to the horizontal such that the lithium vapour which condenses to a liquid flows down the plates 52 into a condensate collection trough 63.

The lithium collection unit F includes an opening 66 which connects the lithium collection trough 63 to the lithium collection and packaging vessel 61 via the lithium sealing device 65. The vessel 61 is connected to vacuum pumps, not shown via conduit 64.

Residue outlet G includes a barometric leg 70 which extends from the bottom of the catchment vessel 41 to a point beneath the surface of the molten lixiviant 1 in the separator vessel 2. Unit G also includes an electromagnetic pump 71 which draws the two phase mixture 40 from the catchment vessel 41 and flows it into the separator vessel 2.

Figure 2:
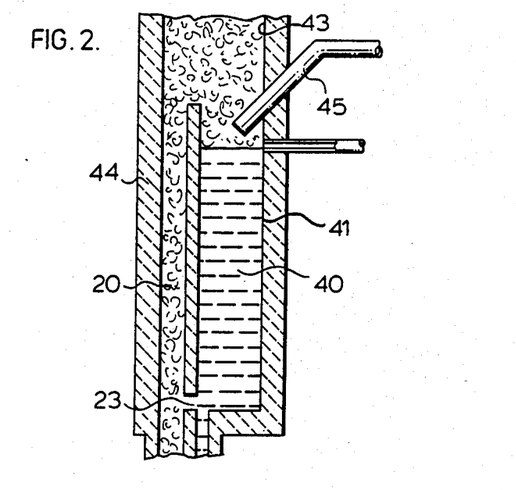
FIG. 2 is a fragmentary vertical cross-section through part of a modified apparatus.
Figure 3:
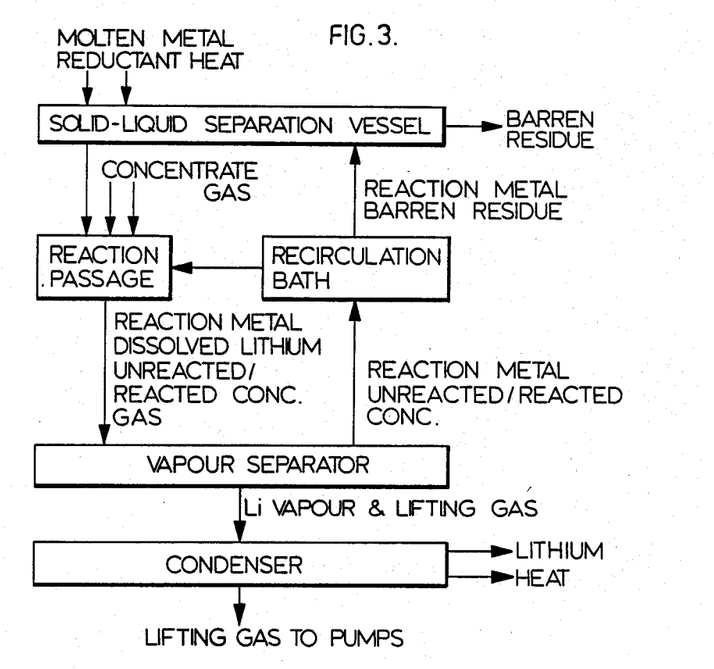
FIG. 3 is a method flow sheet.

Referring to FIG. 2, an alternative arrangement is shown, in which there is a chute 45 leading to an upper part of the catchment bath 41 for adding lithium source material in that zone and an injector 46 leading from a supply of scavenging gas, not shown, to a point above the surface of the catchment bath, beneath the shower of drops, for injecting scavenging gas in that region.

It is of course understood that the Units D and E, including the passage 20 and the catchment bath form part of a closed vacuum chamber, sealed off at the bottom by the contacts of the legs 24 and 70 and leading at the top to the outlet passage 54 and the restricted liquid value metal passage 66.

OPERATION

In operation, the solid-liquid separation vessel A is filled with molten metal reductant 1. Heat is supplied to vessel 2 to melt the reductant and maintain the system at operating temperature. A vacuum is drawn in vacuum separator D causing the molten reductant to flow upwards through the barometric legs 24 and 70 and into the reactor passage 20 and recirculation bath 40. The vacuum is maintained at a level sufficient to cause rapid emission of the lithium vapour and rapid bulk flow of the gaseous mixture formed in the vacuum separator chamber.

Inert non-condensible mixing and lifting gas is injected into the reaction passage 20, through injector 33, causing the molten mixture to flow upwards through the reaction passage 20 and discharge as a spray from the outlet 25 of the reaction passage 20 into the vapour separator 43.

Finely powdered lithium source material is added to the system either by pneumatic transport and injection through the injector 33 (FIG. 1) or by vibrational feeding down chute 45 (FIG. 2). The agitation provided by the lifting and mixing gas causes the powdered lithium source material to mix thoroughly and react with the molten reductant and to form a two phase mixture. The mixture recirculates from the recirculation bath 40 through opening 23, upwards through the reaction passage 20, as a dispersion through the vacuum space in the vapour separator chamber 43 and back into the recirculation bath 40.

A predetermined portion of the recirculating two phase mixture 40 in which the lithium source material has been depleted of lithium is drawn downwards through barometric leg 70 by the action of the electromagnetic pump 71 and is flowed into the solid-liquid separator vessel 2.

Fluxing agents may be added into separator vessel 2 to the flow from leg 70 in order to lower the melting point of the barren residue and to facilitate agglomeration of the particles. The second phase particles float to the surface due to the density difference between them and the molten meltal reductant and form either a liquid slag which is continuously overflowed or a solid dross which is intermittently skimmed off. The overflowed or skimmed-off material is disposed of.

Additions of the reducing metal are made to the vessel 2 to maintain sufficient activity and quantity of the reducing metal in the system. A predetermined portion of the molten reducing metal is drawn upwards through the barometric leg 24 by the action of the electromagnetic pump 21 and flowed into the bottom of the reaction passage 20.

The lithium source material particles are quickly wetted by the agitation by the lifting and mixing gas in the reductant metal so that lithium oxide which is chemically combined in the lithium source material is enabled to react rapidly with the molten metal reductant. Lithium atoms transfer from the ore or concentrate and dissolve in the metallic reductant.

Lithium evaporates from the spray of droplets in the vapour separator 43.

Inert non-condensible scavenging gas is injected into the vacuum separator chamber 43, through injector 46, causing the mixture of lithium vapour and lifting and mixing gas to flow rapidly towards the condenser 50 and the vacuum outlet 54 under the action of the pressure gradient induced by the condensation of the lithium as a liquid on the condenser 51 and by the removal of non-condensible gas by the vacuum pumps, not shown.

The liquid lithium condensate flows down the condenser plates 52 into the condensate collection trough 63 and out of the vacuum separator B through the opening 66.

A lithium outlet sealing device 65, which has been used to close the opening 66 with a plug of frozen lithium during start up, is heated, melts the lithium which had been frozen in the opening 66 and allows lithium to flow into the lithium collection vessel 61 for recovery and casting into saleable forms. The lithium outlet sealing device is used to close off the vacuum separator B to the atmosphere during startup or when the lithium collection vessel 61 requires to be disconnected from the system.

VARIABLE FACTORS

Metal Recovered

The method of the invention has been described in detail in connection with removing lithium from a source material (ore or concentrate) containing it. In practice, any Group IA or Group IIA metal can be recovered by this method. Most Group IA and IIA metals have boiling points less than 1500° C. and standard free energy of formation of their oxides at 1000° C. greater than the standard free energy of formation of the oxides of common reductants, for example, aluminum, silicon, carbon and hydrogen. See the table below. A mixture of reductant and Group IA or IIA metal oxide is in equilibrium at 1000° C. with the Group IA or IIA metal vapour at a pressure fixed by the temperature of the system and the standard free energy of reaction between; the reductant, the Group IA or IIA metal oxide, the reductant oxide and the Group IA or IIA metal vapour. Thus in practice, the Group IA or IIA metal can be extracted from their ores or concentrates by withdrawing the Group IA or IIA metal vapour from a system containing the above mixture and in which the above reaction takes place. The Table below also lists the vapour pressure of the Group IA or IIA metal vapour in equilibrium with the reaction mixture, when the reductant is aluminum.

|  | BOILING POINT (°C.) | STANDARD FREE ENERGY OF FORMATION OF THE OXIDE AT 1000° C. (joules) | PRESSURE (Pascal) |
|---|---|---|---|
| GROUP IA | | | |
| Li | 1317 | −496,075 | 3274 |
| Na | 883 | −228,498 | $>>10^5$ |
| K | 754 | −169,000 | $>>10^5$ |
| Rb | 688 | −93,789 | $>>10^5$ |
| Cs | 671 | −82,350 | $>>10^5$ |
| Fr | (677) | ? | ? |
| GROUP IIA | | | |
| Be | 1560 | −474,596 | $<<1$ |
| Mg | 1090 | −487,000 | 1247 |
| Ca | 1484 | −575,000 | 1 |
| Sr | 1384 | −466,278 | 75 |
| Ba | 1640 | −423,536 | 226 |
| Ra | 1140 | ? | ? |
| COMMON REDUCTANTS | | | |
| C | 3652(sub) | −225,000 | — |
| $H_2$ | (gas) | −178,128 | — |
| Si | 2355 | −650,000 | — |
| Al | 2467 | −1,275,000 | — |

The rate of reaction in the mixture is normally very slow due to solid state diffusion and poor contacting between the reductant and the value metal source material which may have led away from any thought of employing any such method in favour of competitive, alternative methods which do not exploit the principles described.

Ore or Concentrate

The lithium source material which is fed into the system contains the value metal at a concentration high enough to make recovery viable, for example, in the range from 1 to 5%, by weight, representative of the common minerals containing lithium, for example, spodumene, lepidolite, petalite and amblygonite. The lithium source material is in a finely divided form to promote rapid reaction in the reaction passage. However, limits exist for the size of the particles, since too fine particles will be swept out of the system by the gas flow and too coarse particles will take excessively long time to react. Thus the preferred size is in the range from 10 micrometers to minus 65 mesh.

Flow Rate of Ore or Concentrate

The rate at which lithium source is flowed into the system is adjusted to match the production rate of the process which has been predetermined taking into consideration market supply and demand relationships. The range of flow rate is from 1 to 100 kg of contained lithium per hour with the preferred flow rate in the range from 5 to 20 kg of contained lithium per hour.

Molten Reaction or Reducing Metal

The molten reducing metal must be a metal having (i) sufficient reducing activity to extract the lithium from the ore or concentrate, (ii) good wetting characteristics such that there is rapid reaction between the liquid reductant and solid feed, (iii) sufficient solubility for lithium such that the reducing metal does not quickly become saturated with lithium, (iv) low vapour pressure such that little of the reducing metal co-evaporates with the lithium, (v) sufficient density such that a clean separation can be made between the barren residue and the recirculating molten metal, (vi) low enough melting temperature such that the apparatus may be constructed from readily available materials and (vii) low enough cost such that the process remains viable.

Thus the molten metal reductant or reaction metal may be a single reducing metal or an alloy comprising a reductant and a second metal which acts to increase the density and/or wettability of the alloy. The metals which act as reductants are picked from the group consisting of aluminium, silicon, titanium, chromium. The alloying metals are picked from the group consisting of copper, nickel, cobalt, magnesium and uranium. The preferred metals to act as reductants are picked from the group consisting of aluminum and silicon and the preferred alloying metals are picked from the group consisting of copper, magnesium and nickel. The composition of the alloy is chosen such that the alloy remains molten and fluid at the operating temperature in addition to maintaining as high a reducing activity as possible.

Temperature

The temperature in the system is high enough to promote rapid reaction between the ore or concentrate and the molten reducing metal. The lower limit of temperature is set by the melting point of the reducing metal or alloy and the upper limit is set by the service temperature of the reaction passage. Thus for lithium extraction, an operating temperature range is from 800° to 1500°C. with a preferred temperature range from 900° to 1200° C.

Vacuum Separator Pressure

The level of vacuum in the vacuum separator vessel has an upper limit set by the rate of evaporation and mass transport of the lithium vapour and a lower limit set by the capacity of the installed vacuum pumps. The upper limit is affected by the level to which lithium dissolves in the molten reducing metal and the installed pumping capacity is constrained by operating and capital cost. The operating pressure is desirably in the range from 1 to 50,000 pascals with the preferred operating pressure in the range from 10 to 1000 pascals.

Flow Rate of Molten Metal Reductant Through Barometric Legs

The flow rate of molten metal reductant through the barometric legs into and out of the vacuum separator in addition to the volumes o the vacuum separator and the solid-liquid separator control the residence time of the two phase mixture in the recirculation bath and the residence time the molten metal reductant is in the solid-liquid separation vessel. Thus the flow rates in steady operation are the same in each leg and are in the range from 10 to 1000 kg per minute with the preferred flow rate being in the range from 100 to 300 kg per minute.

Residence Time in Recirculation Bath

The residence time of the recirculating two phase mixture in the recirculation bath is sufficient to obtain 90% extraction of the lithium from the lithium source. Thus the residence time of the recirculating two phase mixture in the recirculation bath is in the range from 1 to 100 minutes, with the preferred residence time in the recirculation bath in the range from 20 to 50 minutes.

Residence Time in Solid-Liquid Separation Vessel

The residence time of the molten metal reductánt in the solid-liquid separation vessel is sufficient to eliminate 90% of the second phase particles from the molten metal reductant. Thus the residence time of the molten metal reductant in the solid-liquid separation vessel is in the range from 10 to 1000 minutes with the preferred residence time in the range from 50 to 200 minutes.

Volume of Vessels

The volume of the vessels along with the differential flow rate into and out of the vessel determines the residence time of the fluid in that vessel. Thus the volume of the recirculation bath is in the range from 0.5 to 10 $m^3$ with the preferred volume in the range from 1 to 5 $m^3$, and, the volume of the solid-liquid separation vessel is in the range from 1 to 20 $m^3$ with the preferred volume in the range from 2 to 10 $m^3$.

Lifting, Mixing and Contacting Gas

The lifting, mixing and contacting gas acts to create violent agitation in the reaction passage without substantial reaction of the gas with the solid or liquid phases. Thus, the gas is chosen from a group consisting of argon, helium and nitrogen with the preferred gas being argon. Small amounts of a second gas may be added to enhance wetting between the solid and liquid. Thus the additive gas is chosen from a group consisting of gases which contain chlorine and/or fluorine with the preferred additive gas containing chlorine.

Flow Rate of Lifting and Mixing Gas

The flow rate of lifting and mixing gas is sufficient to generate a dispersion of the reaction mixture in the vapour separator having sufficient area to produce rates of lithium evaporation commensurate with the feed rates of lithium. Thus the gas flow rate is in the range from 0.01 to 1.0 $Nm^3$/min with the preferred flow in the range from 0.05 to 0.2 $Nm^3$/min.

Recirculation Rate of Two Phase Mixture Through Reaction Passage

The recirculation rate through the reaction passage is fixed by (i) the Lift-Factor which is defined as the fraction of the reaction passage extending above the surface of the recirculation bath, (ii) the gas flow rate and (iii) the cross-sectional area and shape of the reaction passage. The Lift-Factor, defined as the fraction of the reaction passage extending above the surface of the mixture in the catchment bath, is in the range from 0 to 0.5 with the preferred range from 0.1 to 0.5. The cross-sectional area of the reaction passage is in the range from 0.002 to 0.3 $m^2$ with the preferred cross-sectional area in the range from 0.008 to 0.15 $m^2$.

Residence Time in Reaction Passage

The residence time in the reaction passage is fixed by the rate of overflow of the two phase mixture of reductant and lithium source material and the volume of the reaction passage. However, since the two phase flow is recirculating through the reaction passage and recirculation bath at a high flow rate, the residence time in the reaction passage is effectively the same as the residence time in the recirculation bath. Thus the residence time in the reaction passage is in the range from 1 to 100 minutes with the preferred residence time in the range from 5 to 20 minutes.

Surface Area of Mixture Spray

The surface area of the spray of two phase mixture determines the rate of evaporation of the lithium. Thus the surface area is in the range from 1 to 100 $m^2$ with the preferred area in the range from 20 to 50 $m^2$.

Temperature of Condenser

The temperature of the condenser controls the vapour pressure of the lithium in the vacuum outlet and the rate of condensation. Thus the temperature of the condenser is in the range 180° to 400° C. with the preferred temperature in the range from 180° to 200° C.

Scavenging Gas Flow Rate

A non-condensible, inert scavenging gas is required when the vapour pressure of the value metal in the molten lixiviant is less than the total pressure in the vacuum separator chamber. When the vapour pressure of the value metal in the molten lixiviant is greater than the total pressure in the vacuum separator chamber, there is no requirement for scavenging gas injection. For the former, the scavenging gas causes the mixture of lithium and lifting and mixing gas to flow rapidly from the vicinity of the metal shower to the condenser. The speed of the flow depends on the total molar flux of the gaseous mixture and the total pressure in the vacuum separator chamber. Thus the scavenging gas flow rate is in the range from 0 to 20 $Nm^3$ per kilogram-hour of value metal produced, with a preferred scavenging gas injection flow rate in the range from 0 to 100 Nm³ per kilogram-hour of value metal produced.

EXAMPLE

Figure 4:
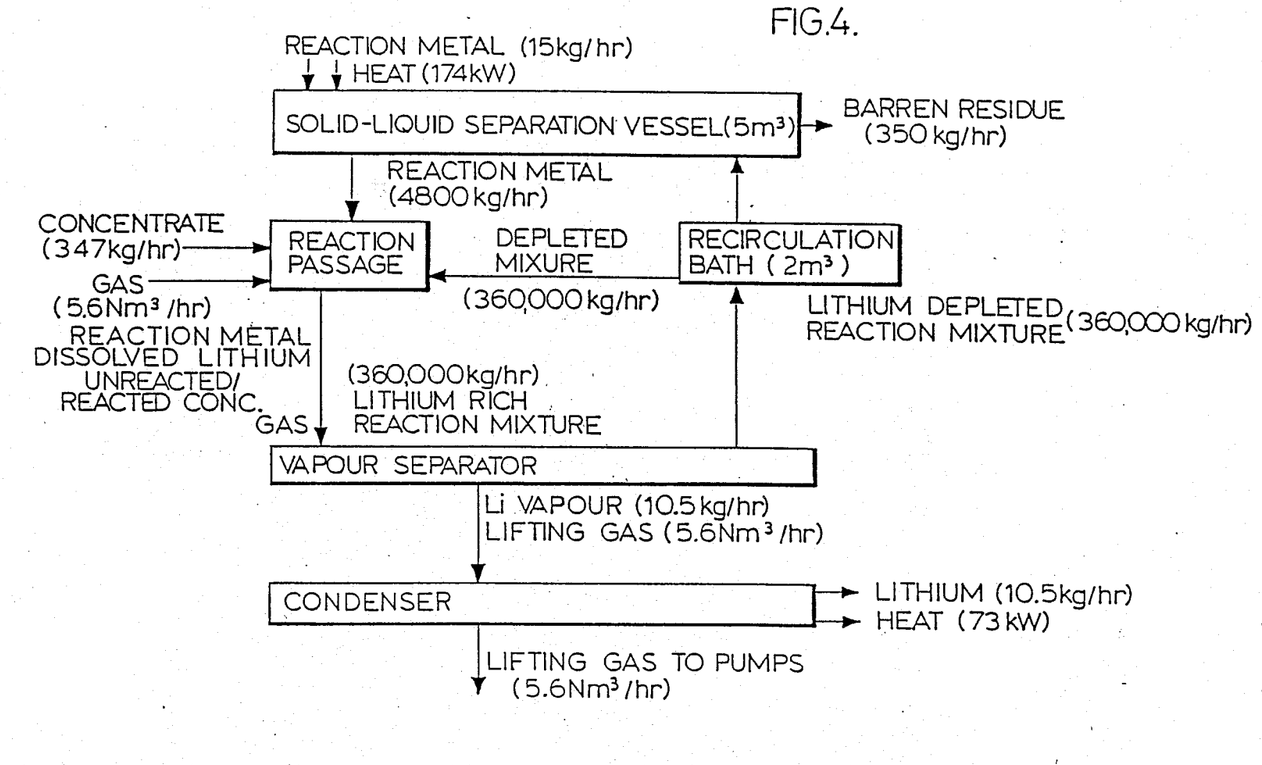
FIG. 4 is a method flow sheet showing flow rates for a specific preferred example of the method.

The following is an example of producing 1,000 kg of lithium per week in an apparatus as shown in FIGS. 1 and 2 and is described with reference to FIG. 4 which shows a flow sheet of the process and the mass flow rates around the process.

Twelve thousand kg of aluminum alloy were melted in the reservoir vessel and superheated to an operating temperature of 1,000° C. Vacuum was drawn to a level of 100 pascals in the vacuum separator unit which had been preheated to 1,000° C. Aluminum flowed upward to a height in equilibrium with the level of vacuum through the two barometric legs which had been submerged beneath the surface of the aluminum bath in the solid-liquid separation vessel.

The electromagnetic pumps were then started and created a circulation of roughly 5 tonnes per hour of aluminum into and out of the vacuum separator unit. The absolute flow rate of aluminum was estimated by the viscous drag exerted on a submerged sphere positioned in the outlet of the downcomer and the relative rate was controlled by monitoring, via load cells, the total mass of the vacuum separator unit.

Three hundred and fifty kg per hour of minus 65 mesh spodumene concentrate having a lithium oxide content of 7.25 wt.% was added to the reaction passage by pneumatic transport through the injector. Equivalent results may be achieved by vibratory feeding into the recirculation bath. The flow rate of spodumene was controlled by monitoring the total mass of the supply vessel which contained roughly one day of production, 8 tonnes.

Inert lifting, mixing and contacting gas comprising mainly of commercial grade deoxygenated and dehumidified argon was injected at a rate of 5.6 Nm³ per hour into the base of the reaction passage which had an internal diameter of 0.15 m and a length of 2.6 m. The injected gas acted to thoroughly disperse the particles of concentrate throughout the aluminum which was flowing into the reaction passage from the solid-liquid separation vessel. The violent mixing of the gas created a intimate mixture of the two phases. In addition, the injected gas created an upward flow of the mixture at roughly six tonnes per minute through the reaction passage and which circulated within the vacuum separator unit at a flow rate of roughly 6 tonnes per minute.

The mixture was sprayed through the vapour separator as a shower of droplets comprising about 2% of the bath and having a surface area of roughly 25 m². Lithium transferred from the spodumene into the molten aluminum and was replaced in the spodumene by aluminum. The dissolved lithium content of the aluminum was 1.45 wt.% and the lithium evaporated from the spray at a specific rate of 10.5 kg per hour. The injected gas and the evaporated lithium flowed towards the condenser at a bulk velocity of 65 m/s.

Lithium condensed, as a liquid, on the condenser which had a contact length of 0.7 m and a characteristic spacing of 0.05 m and which was maintained at 190° C. The cooled lifting, mixing and contacting gas which did not condense was removed by the vacuum pumps, the exhaust from which was collected, filtered and recompressed for recycling to the reaction passage.

The condensed liquid lithium was flowed out of the collection trough by heating the lithium sealing device to melt the plug of lithium in the lithium outlet. The lithium flowed into the evacuated lithium packaging chamber where the lithium was cast into 0.5 kg ingots and sealed in airtight containers. Once per day, the lithium outlet was sealed and the packaging chamber opened to remove the 400 ingots which had been produced.

The molten aluminum which was flowing out of the vacuum separator carried with it 350 kg of depleted spodumene residue which had had 90% of the lithium extracted. The barren residue floated to the surface of the aluminum bath in the solid-liquid separation vessel and was removed by continuous overflowing. Similar results may be obtained by intermittent skimming.

Production was terminated by 1st, stopping the flow of spodumene concentrate, 2nd, stopping the flow of injected gas, 3rd, stopping the recirculation of aluminum into and out of the vacuum separator, 4th, sealing the lithium outlet once the lithium collection trough had drained, 5th, releasing the vacuum in the vacuum separator by flooding with argon, 6th, recovering the overflow from the solid-liquid separation vessel, 7th, casting the contents of the solid-liquid separation vessel into forms ready to be reused in a further production run.

We claim:

1. A method of recovering a value metal belonging to Group IA or Group IIA of the Periodic Table from a source material comprising an ore or concentrate of the value metal, comprising:
    mixing the source material, in finely divided form, with an excess of a molten reaction metal reactable with said source material, under agitation, to rapidly wet said source material with said molten reaction metal,
    allowing said molten reaction metal to react with said source material to form a molten mixture of an alloy of said value metal and said reaction metal and a dispersate of partially depleted source material in said excess of molten reaction metal,
    subjecting the alloy to vacuum to separate the value metal therefrom as a vapour,
    condensing the separated vapour and recovering the value metal.

2. A method according to claim 4, wherein said mixing under agitation comprises continuously flowing a lifting and mixing gas through said molten mixture at a flow rate of from 0.01 to 1.0 Nm³/min. to agitate said mixture and sub-divide said mixture into droplets, and subjecting said droplets to said vacuum.

3. A method as defined in claim 2, in which the excess molten reaction metal is continuously segregated from the partially depleted source material and the segregated excess molten reaction metal is re-united with unreacted source material to reform said molten mixture.

4. A method as defined in claim 2, in which the reaction metal is a reaction alloy of a first metal effective to reduce the ore or concentrate to the value metal and a second metal effective to increase the density of the reaction alloy.

5. A method as defined in claim 2, in which the reaction metal is a reaction alloy of a first metal effective to reduce the ore or concentrate to the value metal and a second metal effective to increase the wettability of the reaction alloy.

6. A method as defined in claim 2, in which droplets have a surface area within the range from about 1 to 100 m².

7. A method as defined in claim 2, in which the ore or concentrate is finely divided to within the range from 10 micrometers to −65 mesh.

8. A method as defined in claim 2, in which said vacuum is established by an operating pressure within the range from 1 to 50,000 pascals.

9. A method as defined in claim 7, in which the operating temperature maintained is within the range from about 900° C. to about 1500° C.

10. A method as defined in claim 2, in which a scavenging gas is introduced into said vapour at a flow rate in the range from 0 to 200 Nm³ per kilogram-hour of value metal produced.

11. A method as defined in claim 9, in which the value metal is lithium.

12. A method as defined in claim 2, in which the value metal is lithium and the reaction metal is aluminum.

13. A method as defined in claim 2, in which the value metal is lithium and the reaction metal is an alloy of aluminum and a metal effective to raise the density of the resulting alloy.

14. A method as defined in claim 2, in which the value metal is lithium and the reaction metal is an alloy of aluminum and a metal effective to raise the wettability of the resulting alloy.

15. A method as defined in claim 9, in which the value metal is lithium.

16. A method as defined in claim 9, in which the value metal is lithium and the reaction metal is aluminum.

17. A method as defined in claim 9, in which the value metal is lithium and the reaction metal is an alloy of aluminum and a metal effective to raise the density of the resulting alloy.

18. A method as defined in claim 11, in which the source of material is introduced to said excess of molten reaction metal at a flow rate within the range from 1 to 100 kilograms of contained lithium per hour.

19. A method as defined in claim 10, in which the value metal is lithium.

20. A method as defined in claim 10, in which the value metal is lithium and the reaction metal is aluminum.

21. A method as defined in claim 10, in which the value metal is lithium and the reaction metal is an alloy of aluminum and a metal effective to raise the density of the resulting alloy.

22. A method as defined in claim 10, in which the value metal is lithium and the reaction metal is an alloy of aluminum and a metal effective to raise the wettability of the resulting alloy.

23. A method of recovering a value metal belonging to Group IA or Group IIA of the Periodic Table of Elements from a source material comprising an ore or concentrate of the value metal, comprising:

providing a treating circuit including enclosure means forming an elongated upwardly extending reaction passage, leading at an upper end to a vacuum separator chamber, a condensing means between said reaction passage and said vacuum separator chamber, an outlet at said upper end to which vacuum is applied, said reaction passage having a lower end connected with a conduit leading from a reservoir, and a catchment bath having an upper end leading from the vacuum separator chamber and a lower end leading through a passage to said reservoir, establishing a bath of molten reaction metal in said reaction passage and reservoir such that said conduit leads beneath a surface of the molten bath and said passage of said catchment bath leads beneath said surface, continuously adding finely divided ore or concentrate to said circuit so as to reach a lower part of the reaction passage, in an amount such that said molten reaction metal is in an excess, continuously adding an inert lifting gas to a lower part of the reaction passage to agitage the contents, reacting said molten reaction metal with said source material in said reaction passage to form a molten mixture of an alloy of the value metal and the reaction metal and a dispersate of partially depleted ore or concentrate in said excess of molten metal, circulating said molten mixture and dispersate in upward flow in the reaction passage with the lifting gas and spraying the molten mixture into the vacuum separator chamber as a continuous spray comprising a volley of droplets, drawing off the value metal as a vapour from said droplets by vacuum towards said outlet, condensing said vapour on the condensing means and recovering the condensed vapour as a liquid, allowing said spray to fall from the vacuum separator chamber into said catchment bath and pass to the reservoir, continuously removing depleted ore or concentrate from the reaction metal within the reservoir, and recycling the reaction metal from the reservoir to the lower part of the reaction passage.

24. A method as defined in claim 23, in which said enclosure means includes a passage between the lower end of the catchment bath and the lower end of the reaction passage, and recycling a part of the fallen spray directly from the catchment bath to the reaction passage, while part passes to the reservoir.

25. A method as defined in claim 24, in which the flow of molten reaction metal through the conduit from the reservoir to the reaction passage in said recycling and the flow of said fallen spray through the passage from the catchment bath to the reservoir are controlled to regulate the reaction time between said molten reaction metal and said source material in the reaction passage.

26. A method as defined in claim 23, wherein the finely divided ore or concentrate is added directly to said lower part of the reaction passage.

27. A method as defined in claim 23, in which the finely divided ore or concentrate is added to the catchment bath and passes therefrom to the reaction passage.

28. A method as defined in claim 23, in which the volume of molten bath in the reservoir is adjusted to control the time of separation of slag in the reservoir.

29. A method as defined in claim 23, in which the vapour pressure of the value metal in the molten reaction mixture is less than the total pressure in the vacuum separator chamber, and including injecting a non-condensible inert scavenging gas into the vacuum separator chamber to cause a mixture of value metal vapour and lifting gas to flow rapidly from the volley of droplets to the condensing means.

30. A method as defined in claim 25, in which the flow rate of said fallen spray from the catchment bath to the reservoir and the flow of said molten reaction metal from the reservoir to the reaction passage is within the range from 10 to 1000 kilograms per minute.

31. A method as defined in claim 25, in which the residence time of the said molten reaction mixture in the reaction passage is within the range from 1 to 100 minutes.

32. A method as defined in claim 23, in which said circuit has a Lift Factor within the range from 0 to 0.5.

33. A method as defined in claim 23, in which the temperature of the condensing means is within the range from 180° C. to 400° C.

34. A process for recovering value metal from a source material comprising an ore or concentrate of the value metal, comprising the steps of:
forming a mixture of finely divided source material in an excess of molten metal, having a vapour pressure lower than the vapour pressure of the value metal, said molten metal being capable of reacting with the source material to form an alloy of said value metal and said molten metal, and a substance creating effervescence of the mixture whereby droplets of the mixture are emitted from the surface,
subjecting the mixture to vacuum effective to cause emission of the value metal from the droplets of the mixture as a bulk flow of rising vapour, and
condensing the vapour and recovering the value metal from the condensate.

35. A process as defined in claim 34, in which the value metal is lithium.

36. A process as defined in claim 35, in which the molten reaction metal is selected from the group consisting of aluminum, silicon, titanium and chromium.

37. A process as defined in claim 35, in which said reaction metal includes an alloying metal selected from the group consisting of copper, nickel, cobalt, magnesium and uranium.

38. A process as defined in claim 34, in which the substance producing the effervescence is an inert gas injected into the molten metal.

39. A process as defined in claim 38, in which a reactive gas is injected into the molten metal effective to promote wetting between the source material and the reaction metal.

40. A process as defined in claim 39, in which the reactive gas comprises a gas selected from the group consisting of chlorine, sulphur, fluorine and halocarbons.

41. A process as defined in claim 34, in which the vacuum pressure is within the range from 1 to 50,000 pascals.

42. A process as defined in claim 41, in which the droplets have a surface area within the range from about 10 to 100 $m^2$.

43. A process as defined in claim 42, in which the operating temperature is maintained within the range from about 900° C. to about 1500° C.

44. A process as defined in claim 34, in which the droplets have a surface area within the range from 1 to 100 $m^2$.

* * * * *